(12) United States Patent
Agans

(10) Patent No.: US 10,101,917 B1
(45) Date of Patent: Oct. 16, 2018

(54) EVALUATING AND SELECTING DATA CACHING TECHNIQUES

(71) Applicant: EMC IP Holding Company LLC, Hopkinton, MA (US)

(72) Inventor: David J. Agans, Wilton, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 291 days.

(21) Appl. No.: 14/496,119

(22) Filed: Sep. 25, 2014

(51) Int. Cl.
    *G06F 12/00*     (2006.01)
    *G06F 3/06*     (2006.01)
    *G06F 12/0868*     (2016.01)

(52) U.S. Cl.
    CPC .............. *G06F 3/061* (2013.01); *G06F 3/067* (2013.01); *G06F 3/0655* (2013.01); *G06F 12/0868* (2013.01); *G06F 2003/0692* (2013.01); *G06F 2212/1016* (2013.01); *G06F 2212/452* (2013.01)

(58) Field of Classification Search
    CPC ................................ G06F 3/061; G06F 3/0655
    See application file for complete search history.

(56) References Cited

U.S. PATENT DOCUMENTS

| | | | | |
|---|---|---|---|---|
| 9,767,032 B2* | 9/2017 | Talagala | ............... | G06F 12/0891 |
| 2005/0210055 A1* | 9/2005 | Rogers | ....................... | G06F 8/65 |
| 2010/0281216 A1* | 11/2010 | Patel | ..................... | G06F 12/121 711/118 |
| 2013/0185475 A1* | 7/2013 | Talagala | .............. | G06F 12/0866 711/102 |
| 2013/0185488 A1* | 7/2013 | Talagala | ................ | G06F 12/121 711/103 |
| 2014/0047181 A1* | 2/2014 | Peterson | ............. | G06F 12/0873 711/118 |
| 2014/0280679 A1* | 9/2014 | Dey | .................... | H04L 67/2842 709/213 |
| 2014/0281248 A1* | 9/2014 | Alameldeen | ........ | G06F 12/0864 711/128 |
| 2014/0281249 A1* | 9/2014 | Waldspurger | ....... | G06F 12/0802 711/129 |
| 2015/0178207 A1* | 6/2015 | Susarla | ................. | G06F 12/121 711/135 |
| 2016/0321288 A1* | 11/2016 | Malhotra | .......... | G06F 17/30233 |
| 2017/0161198 A1* | 6/2017 | Trika | .................. | G06F 12/0871 |

* cited by examiner

*Primary Examiner* — Prasith Thammavong
(74) *Attorney, Agent, or Firm* — Muirhead and Saturnelli, LLC

(57) ABSTRACT

Described are techniques for evaluating a plurality of caching techniques. Cache decision engines (CDEs) are executed where each CDE uses a different caching technique. The CDEs includes a first CDE that performs data caching in accordance with a plurality of I/O operations and one or more other CDEs each simulating data caching in accordance with the plurality of I/O operations. Sets of performance data are determined with a different one of the sets of performance data determined for each of the CDEs thereby denoting measured performance for the CDE. Using the sets of performance data, it is determined whether any of the one or more other CDEs each simulating data caching has better performance than the first CDE.

20 Claims, 12 Drawing Sheets

EVALUATING AND SELECTING DATA CACHING TECHNIQUES

BACKGROUND

Technical Field

This application generally relates to data storage and, more particularly, to data caching.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of evaluating a plurality of caching techniques comprising: executing a plurality of cache decision engines each using a different one of the plurality of caching techniques, wherein the plurality of cache decision engines includes a first cache decision engine that performs data caching in accordance with a plurality of I/O operations and one or more other cache decision engines each simulating data caching in accordance with the plurality of I/O operations; determining, in accordance with the executing step, sets of performance data, wherein a different one of the sets of performance data is determined for each of the plurality of cache decision engines thereby denoting measured performance for each cache decision engine; and determining, using the sets of performance data, whether any of the one or more other cache decision engines each simulating data caching has better performance than the first cache decision engine. Each of the one or more other cache decision engines may generate a different set of cache metadata. The step of executing may include updating the different set of cache metadata in accordance with processing performed by each cache decision engine when simulating data caching for the plurality of I/O operations; and updating first cache metadata in accordance with processing performed by the first cache decision engine when performing data caching for the plurality of I/O operations. Each of the sets of performance data may include a cache hit ratio. The cache hit ratio may be any of a read cache hit ratio, a write cache hit ratio, and an aggregated I/O cache hit ratio. Each of the sets of performance data may include an indicator denoting an amount of prefetched data that was not referenced to service any of the plurality of I/O operations prior to being evicted from cache. Each of the sets or performance data may include a metric denoting a number of write operations, each writing data to a target location whereby, when storing write data for each write operation in cache prior to destaging, results in overwriting existing cached data for the target location and the existing cached data has already been destaged. Each of the plurality of I/O operations may request an I/O operation with respect to a logical device and location on the logical device, and each of the sets of performance data may include ratio of a number of physical device I/O operations performed to service the plurality of I/O operations. Each of the sets or performance data may include an average measured response time denoting an average amount of time to complete an I/O operation. It may be determined that a second of the one or more other cache decision engines simulating data caching has better performance that the first cache decision engine, and the method may include determining, in accordance with one or more criteria, whether to use the second cache decision engine rather than first cache decision engine to perform the data caching. The one or more criteria may include at least one threshold denoting a threshold amount of performance improvement. The one or more criteria may include a threshold minimum amount of time. A first of the sets of performance data may denote performance of the first cache decision engine, a second of the sets of performance data may denote performance of the second cache decision engine, and the method may include determining, using the first set of performance data and the second set of performance data, whether the second cache decision engine improves performance over the first cache decision engine by at least the threshold amount of performance improvement denoted by the at least one threshold; determining whether the first cache decision engine has been used to perform data caching at least the threshold minimum amount of time; and responsive to determining that the second cache decision engine improves performance over the first cache decision engine by at least the threshold amount of performance improvement and to determining that the first cache decision engine has been used to perform data caching at least the threshold minimum amount of time, using the second cache decision engine rather than the first cache decision engine for data caching. Processing may be performed automatically to use the second cache decision engine rather than the first cache decision engine for data caching. The method may include for each of the one or more cache decision engines simulating data caching, simulating physical device accesses performed as a result of the plurality of I/O operations. The plurality of I/O operations may be received at a data storage system from one or more hosts. Each of the one or more hosts may include a plurality of applications executing in a context of one or more virtual machines in a virtualized application environment. The existing cached data may be write pending at a first point in time, destaged at a second point in time subsequent to the first point in time, and overwritten at a third point in time subsequent to the second point in time.

In accordance with another aspect of the invention is a system comprising: a processor; a memory comprising code stored therein that, when executed, performs a method that evaluates a plurality of caching techniques comprising: executing a plurality of cache decision engines each using a different one of the plurality of caching techniques, wherein the plurality of cache decision engines includes a first cache decision engine that performs data caching in accordance with a plurality of I/O operations and one or more other cache decision engines each simulating data caching in accordance with the plurality of I/O operations; determining, in accordance with the executing step, sets of performance data, wherein a different one of the sets of performance data is determined for each of the plurality of cache decision engines thereby denoting measured performance for each cache decision engine; and determining, using the sets of performance data, whether any of the one or more other cache decision engines each simulating data caching has better performance than the first cache decision engine. The processor and the memory may be included in a data storage system and the system may further comprise one or more hosts that send the plurality of I/O operations to the data storage system, each of the one or more hosts including a plurality of applications executing in a context of one or more virtual machines in a virtualized application environment.

In accordance with another aspect of the invention is a computer readable medium comprising code stored thereon that, when executed, performs a method that evaluates a plurality of caching techniques comprising: executing a plurality of cache decision engines each using a different one of the plurality of caching techniques, wherein the plurality of cache decision engines includes a first cache decision engine that performs data caching in accordance with a plurality of I/O operations and one or more other cache decision engines each simulating data caching in accordance with the plurality of I/O operations; determining, in accordance with the executing step, sets of performance data, wherein a different one of the sets of performance data is determined for each of the plurality of cache decision engines thereby denoting measured performance for each cache decision engine; and determining, using the sets of performance data, whether any of the one or more other cache decision engines each simulating data caching has better performance than the first cache decision engine.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
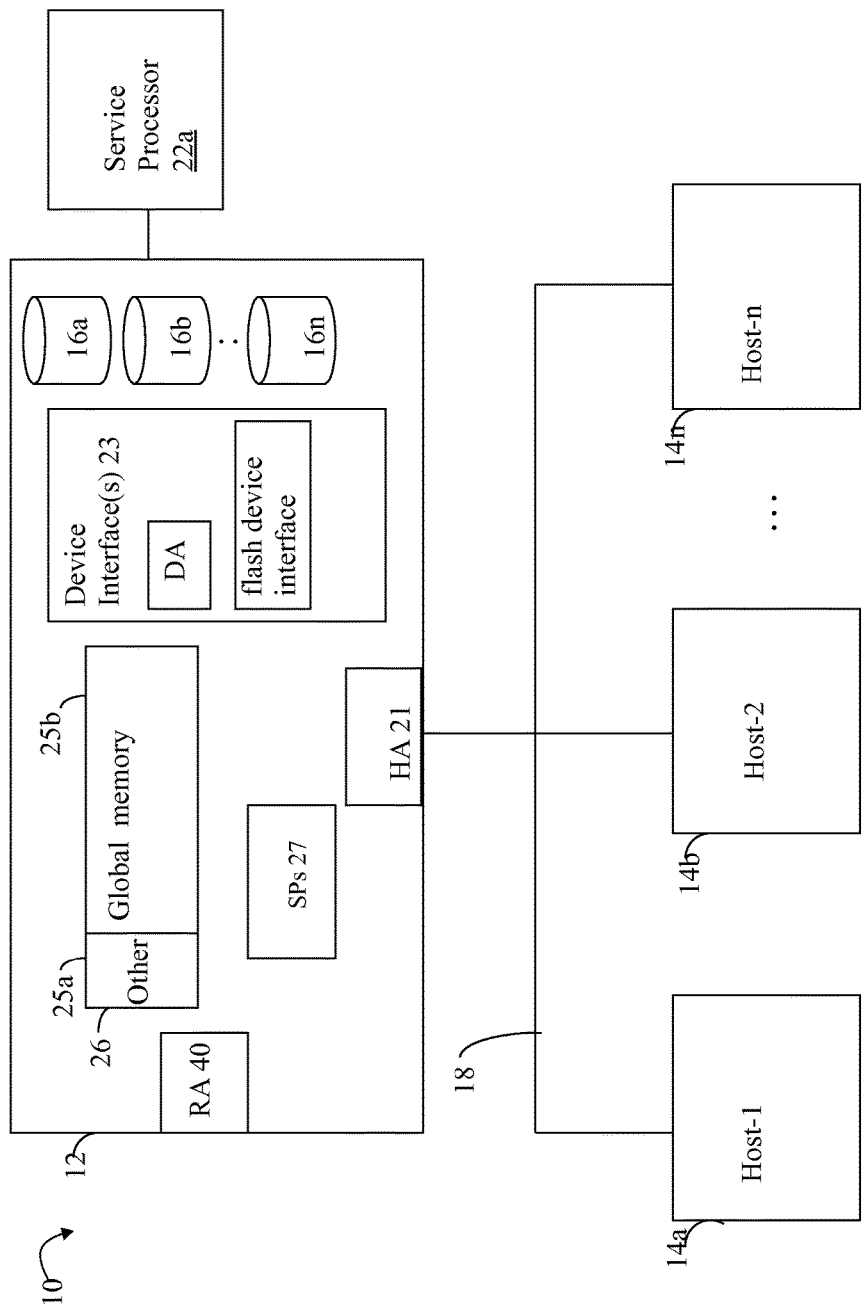
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM) 25b. In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

Figure 2:
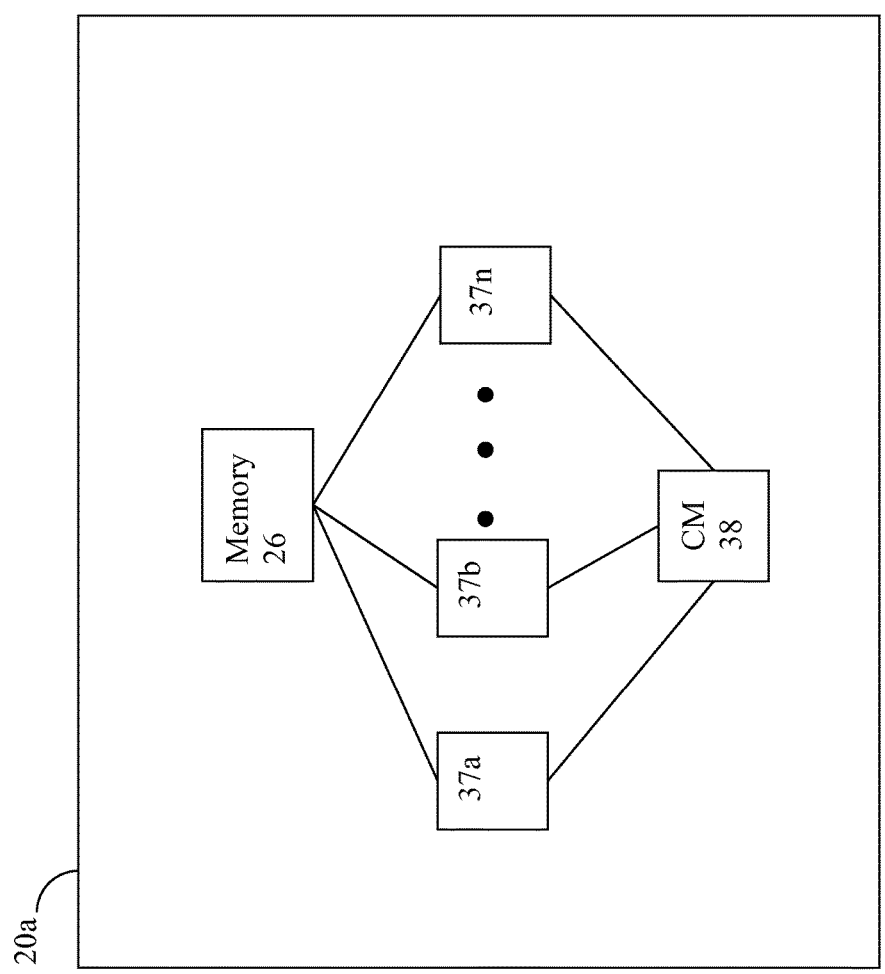
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. In the foregoing data storage array, the data storage devices 16a-16n may include a combination of disk devices and flash devices in which the flash devices may appear as standard Fibre Channel (FC) drives to the various software tools used in connection with the data storage array.

In connection with performing I/O operations, such as writes as well as reads, a data storage system in an embodiment in accordance with techniques herein may use a cache in order to improve performance.

Figure 3:
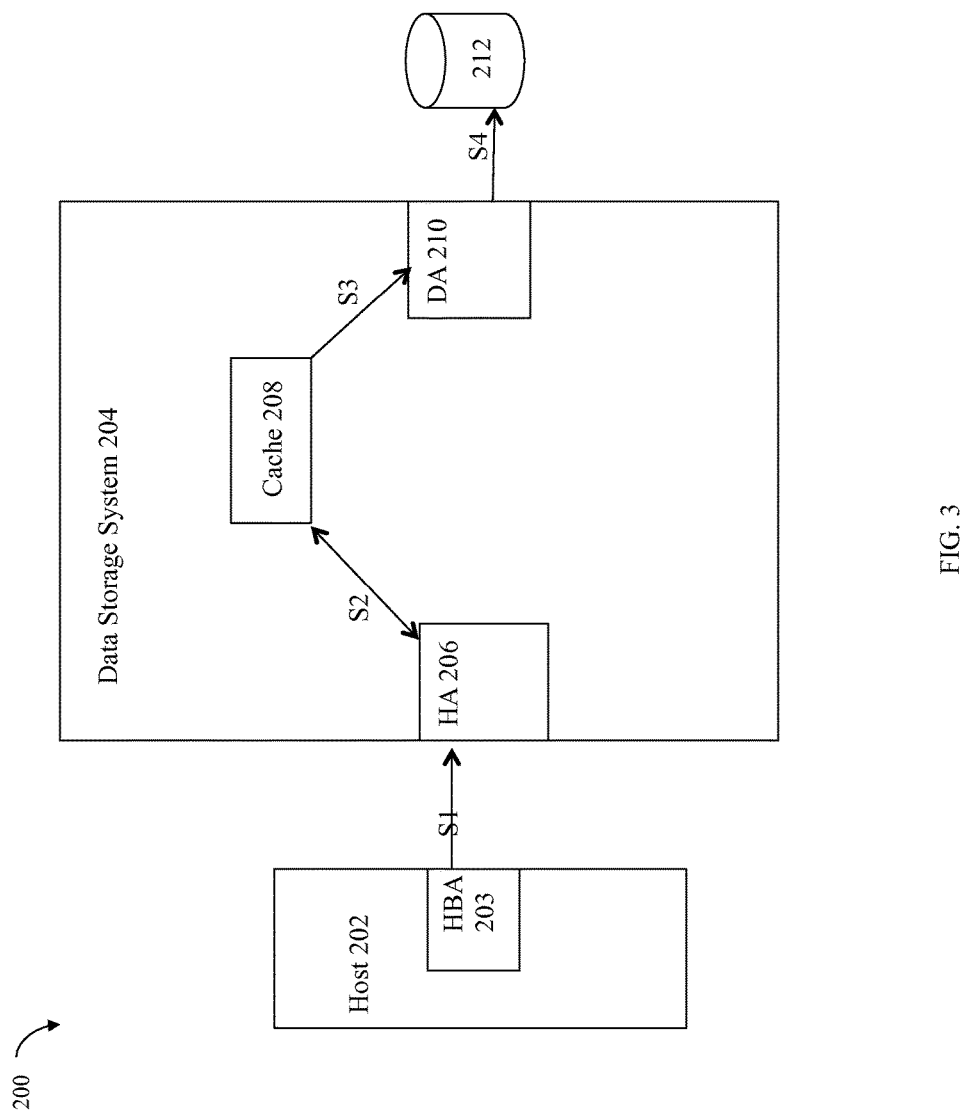
FIGS. 3 and 4 are examples illustrating components and data flow in connection with performing I/O operations in an embodiment in accordance with techniques herein.

Referring to FIG. 3, shown is an example illustrating processing of a write I/O operation received at the data storage system in an embodiment in accordance with techniques herein, whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs and illustrated in FIG. 3 is processing performed for a write operation.

In step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. Although not described herein and as will be appreciated by those skilled in the art, other processing may be performed in connection with processing the write operation such as, for example, setting the cache slot location to no longer indicate WP once the write data is written to physical storage in step S4.

Figure 4:
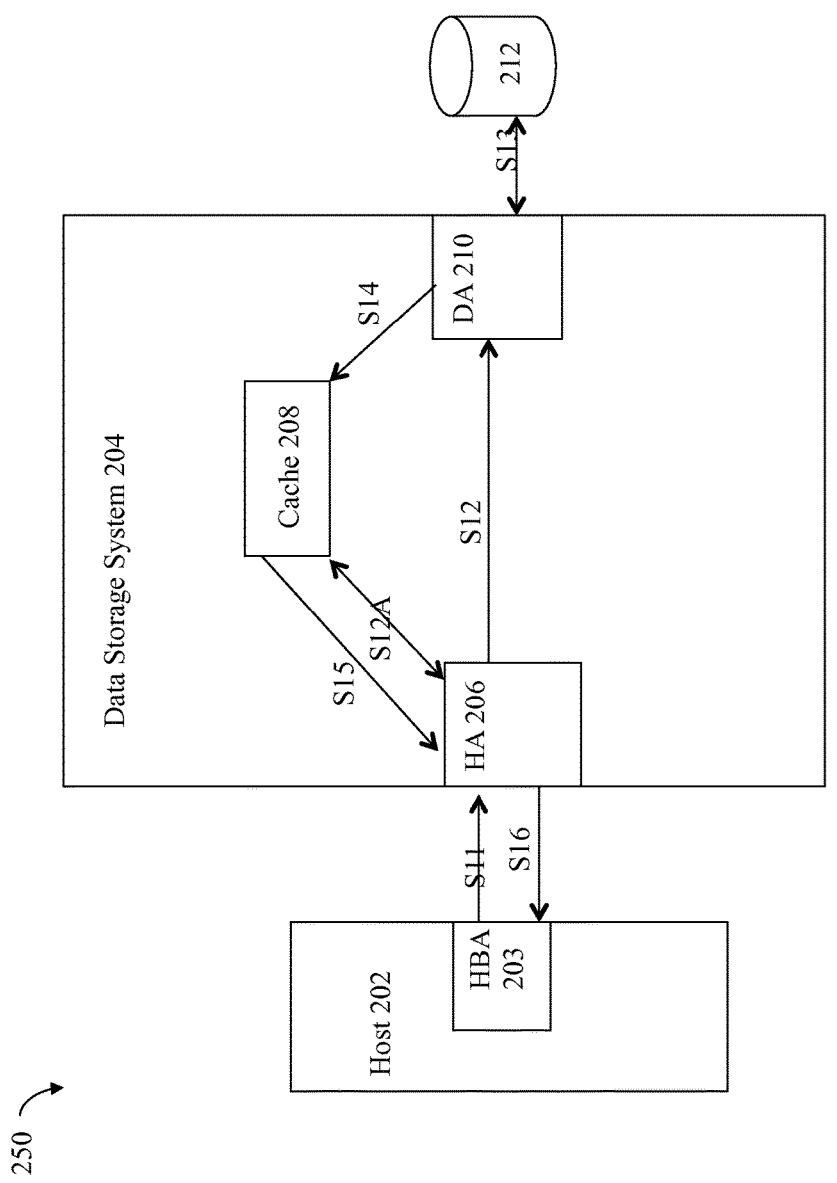

Referring to FIG. 4 shown is an example illustrating processing of a read I/O operation received at the data storage system, in an embodiment in accordance with techniques herein, whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S12A and returns the requested read data to the host 202 in step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S13. The DA 210 may store the read data in cache 208 in step S14. The HA 206 may then retrieve the read data in step S15 from the cache 208 and then return the requested read data (as retrieved from cache) to the host 202 in step S16.

It should be noted that a single host I/O operation may result in one or more back end PD I/Os depending on the physical data storage configuration. For example, the host I/O operation may request to write data to LUN A, LBA 100. Physical storage for LUN A may be provisioned from a RAID group whereby to perform the single host I/O write operation may require multiple reads and/or writes depending on the particular RAID configuration. For example, LUN A may have storage provisioned from a RAID-1 group including two PDs. RAID-1 provides for data mirroring so that the single host I/O operation results in two backend PD writes to the two PDs of the RAID-1 group in order to mirror the write data.

Additionally, a single host I/O operation may result in no back end PD I/Os. For example, the host I/O operation may be read resulting in a read hit.

The cache, like other data storage system resources, may be a finite resource whereby the data storage system may have a limited amount of cache for storing user data in connection with servicing read and/or write operations, such as described above. There may be times when processing is performed to destage WP data from cache to physical storage. As noted above, destaging includes writing out WP data from cache to a physical storage device, such as a physical drive.

As described in more detail in following paragraphs, the size of a single unit of cache data may be referred to herein as a page. The size of a page may vary with embodiment. Thus the granularity or amount of data to be destaged in a single destaging operation may vary with embodiment. In a single cache page, not all the data of the single cache page may be WP data. For example, within a single cache page, it may be that one or more portions of the page include WP data as well as non-WP data. For example, the cache page may include non-WP data that includes data read from a physical device and stored in the cache page in connection with servicing a read miss operation. Additionally, one or more portions of the same cache page including WP data may be empty and contain no data.

Figure 5:
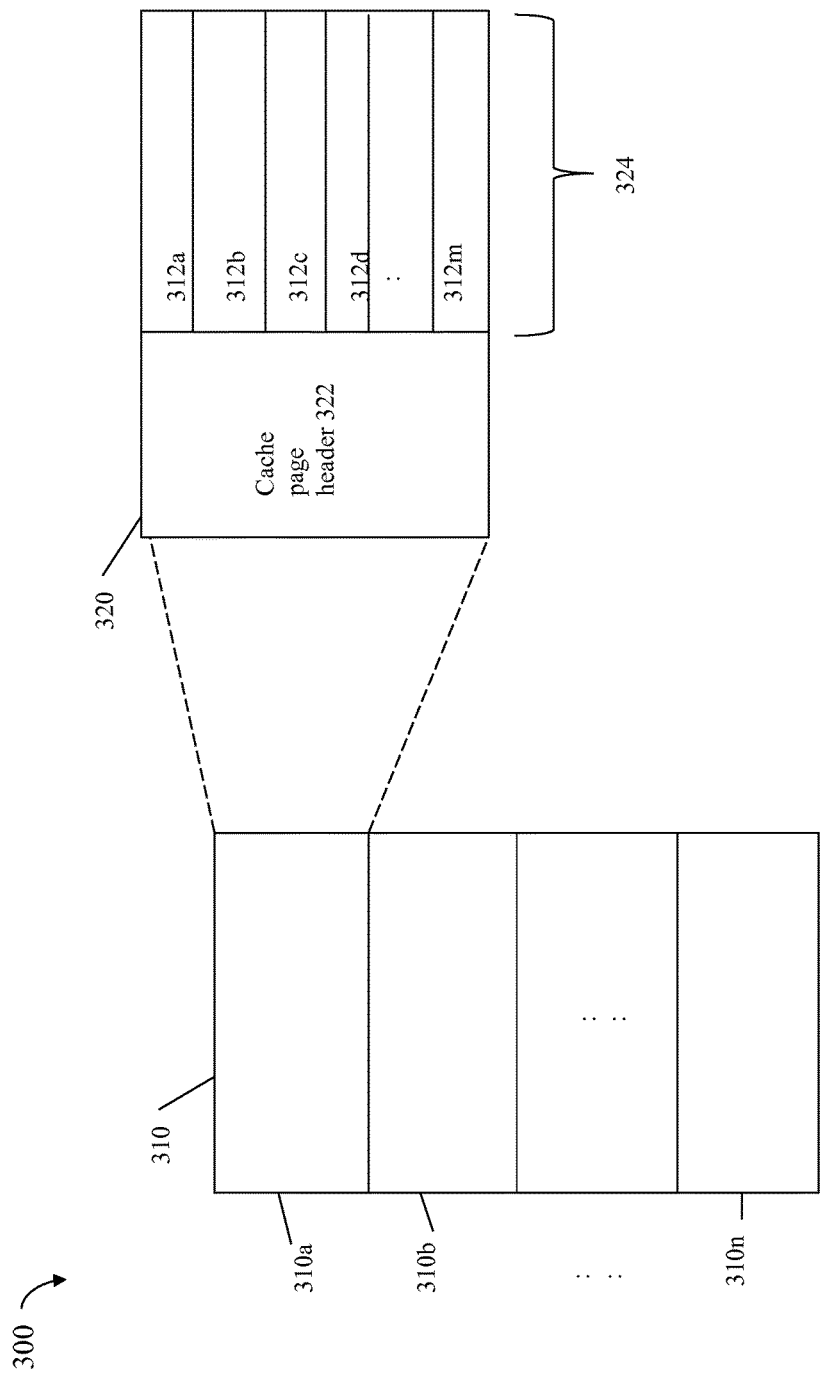
FIG. 5 is a logical representation of a cache that may be used in an embodiment in accordance with techniques herein.

Referring to FIG. 5, shown is an example illustrating a logical representation of a data cache that may be used in an embodiment in accordance with techniques herein. The data cache of FIG. 5 may represent the data cache used by in a data storage system in accordance with techniques herein.

In the example 300, element 310 may represent the memory or storage used as the data cache which is partitioned into cache pages 310a-310n. It should be noted that the example 300 is a logical representation of a cache that may be implemented using any suitable data structure(s) known in the art. Each of the cache pages 310a-n may contain varying amounts of WP data, cached read data, and the like. Element 320 provides additional detail of single cache page 320. Cache page 320 may include a cache page header 322 and cache page data 324. The cache page data 324 illustrates that a single cache page of data may further include multiple portions of data 312*a-m* each of which may or may not include WP data, read cached data, and the like, and each of which may or may not include any cached data. The cache page header 322 may include additional information, such as metadata, regarding the cached data stored in 324. For example, the header 322 may denote whether the data cached in each of the portions 312*a-m* is WP data. In some embodiments, the cache page header 322 of each cache page 320 may be an object which is located in a separate memory area from the cached data 324 of the cache pages 310*a-m*. In some embodiments, each cache page header 322 may include a pointer or other reference to the particular one of the cached data areas 312*a-m* associated with the cache header 322. In this manner as described in more detail herein, the cached data and associated cache metadata (as may be included in the cache page headers and/or elsewhere) may each be stored separate from one another and in any suitable location.

Although not illustrated in FIG. 5 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the data cache 810 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

In a single cache page such as 310*a* (illustrated in more detail by 320), it may be that one or more portions 312*a-m* of the page 320 include WP data as well as non-WP data. For example, the cache page 320 may include non-WP data in 312*a* and 313*c* (e.g., 312*a* and 312*c* may include data read from a physical device and stored in the cache page in connection with servicing a read miss operation). Additionally, one or more portions 312*a-m* of the same cache page 320 including WP data may be empty and contain no data. For example, all of page 320 may include WP data except for 312*a-b* which may contain no cached data.

It should be noted that each portion 312*a-m* of a cache page may correspond, for example, to a track, a number of blocks, or other storage size unit. For each of the "m" portions of a cache page, some or all data of a single portion may be stored in cache since the size unit for reading and writing data may be less than a single data portion.

As noted above, the data cache is a finite resource of the data storage system and may "fill up" or more generally, reach a threshold level for consumption for storing data such that it becomes necessary to select one or more data items to evict from the cache in order to make cache space available for storing subsequent data items.

In a data storage system, a cache decision engine (CDE) may generally perform various aspects of cache management and maintenance and may, for example, perform processing based on a particular algorithm that determines what data to evict from cache and when such eviction of data occurs. The CDE may make this determination in accordance with one or more inputs including metadata about currently cached data and/or I/O workload characteristics of individual I/O streams. Thus, the CDE determines one or more data items that are least valuable or least likely to be needed and selects such one or more data items for eviction from cache.

Metadata about cached data (also referred to herein as cache metadata or metadata) may be maintained as part of cache management. Metadata used by the CDE may generally include information about data stored in the cache. Metadata include information, for example, stored in the cache header and possibly other locations (e.g., such as described in connection with FIG. 5 and elsewhere herein). Metadata may be maintained, for example with reference to FIG. 5, per cache page, per portion of a cache page where there are multiple portions in a single cache page, and the like. More generally, such metadata may be maintained for any suitable level of granularity with respect to data stored in the cache. Such metadata maintained for a data portion stored in the cache may include, for example, how long has the data been in cache since last referenced (e.g., age), when data was last referenced (e.g., time stamp), size of the data, whether data was prefetched, whether the data stored in the cache is WP, and the like.

The CDE may use any one of a variety of different techniques for selecting which one or more data items to evict from cache, decide when such eviction of data occurs and the like. The CDE may be designed for a specific application workload or I/O access pattern. For example, an application may have an I/O workload or I/O access pattern whereby the application does not read or write to the same location multiple times (e.g., the application keeps sequentially reading or writing a stream of data). In this case, the application performance may benefit from prefetching if primarily a sequential read stream and will not benefit from keeping such data that is read or written in cache. Thus, LUNs used by this application should not have their data stored in cache other than as long as may be needed, for example, until WP data is destaged to physical storage.

However, an embodiment may include multiple clients or applications executing on one or more hosts where all such applications send I/Os to the same data storage system and therefore all such applications may share the same data cache resource. The applications may be different types of applications having different workload characteristics or different I/O access patterns. In such an environment, it becomes difficult to customize the particular algorithm, such as used by the CDE for selecting data items for cache eviction, based on the disparate possible workload characteristics or I/O access patterns of the different applications.

It may be possible to have the CDE use different customized caching techniques at different times for the collective application workload or I/O access patterns at different times. However, it may not be possible to practically model or identify the overall workload or I/O access pattern at a particular time due to the unpredictability of the disparate applications executing at any time. The overall workload characteristics or I/O pattern may be generally described as characteristics about the aggregated, combined workload across I/O streams of all applications for the entire data storage system.

Thus, described in following paragraphs are techniques that may be used in evaluating multiple CDEs executing different caching algorithms or techniques. Multiple CDEs may be executed using the same I/O stream. A first of the CDEs may be used to perform the actual data caching and the remaining one or more CDEs may simulate servicing the I/Os including simulating data caching (e.g., without using an actual data cache). Each CDE simulating data caching tracks what data is in cache, and the like, using its own set of cache metadata. Thus, each CDE that simulates data caching may maintain and update its own copy of the cache metadata without actually utilizing a data cache. Each CDE simulating servicing the I/Os may also simulate backend I/Os (e.g., simulating performing reads and writes to PDs in connection with simulating servicing of the I/Os). The performance of each CDE may be measured as the data storage system processes received host I/Os. Processing may be performed to determine, using measured performance data for the multiple CDEs, whether any of the CDEs simulating servicing I/Os and data caching performs significantly better than the first CDE used to perform the non-simulated or actual data caching. If so, the system may replace the first CDE with one of the remaining CDEs that simulates servicing I/Os and data caching where the one CDE selected from the remaining CDEs has the best measured performance of all CDEs evaluated.

Techniques herein do not require that the overall application workload or I/O access pattern be known or modeled. Techniques herein may perform an evaluation and comparison of measured performance of multiple CDEs executing different caching algorithms or techniques. After a time period, if no CDE that simulates data caching is determined to outperform the first CDE used for actual data caching, all CDEs simulating data caching may be discarded and replaced with another set of one or more new CDEs executing yet a different set of caching algorithms or techniques to be evaluated. The foregoing may be performed continuously over the lifetime of the data storage system so that the particular CDE and its caching techniques used to perform data caching may be modified over time as the overall application workload or collective I/O access patterns of all applications may change.

In one embodiment in accordance with techniques herein, virtual machines (VMs) may execute in a virtualized environment where the VMs may access and use data stored on logical devices also referred to herein as virtual volumes (VVOLs) having storage provisioned on a data storage system. For example, an embodiment may have one or more VMs executing on a single physical machine in a virtualized environment using virtualization software, such as vSphere™ from VMware, Inc. In the context of each VM, one or more applications may be executed, where the applications may include any one or more of, for example, an email server application such as Microsoft Exchange Server (MES), a web server, a database server application, and the like, where each of such application may be a client of the data storage system. The VMs may execute, for example, on one or more hosts. Each VM may access and use data stored on one or more virtual volumes having physical storage provisioned on a data storage system.

Figure 6:
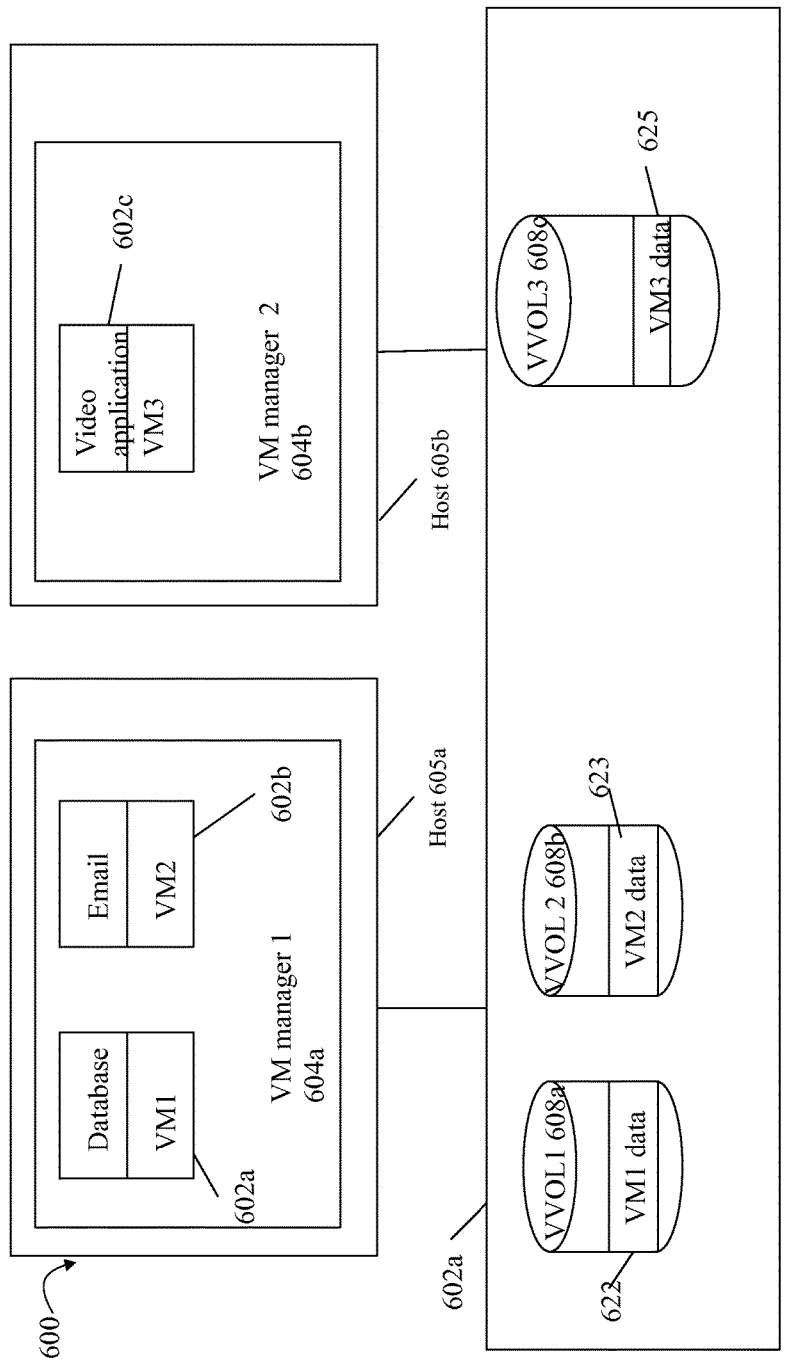
FIG. 6 is an example of data storage systems and hosts including virtual machines in an embodiment in accordance with techniques herein.

Referring to FIG. 6, shown is an example 600 of components of a system that may use techniques described herein. The example 600 *d* includes VM 1 602*a* and VM2 602*b* managed by VM manager 1 604*a* and VM3 602*c* managed by VM manager 2 604*b*. Each of 604*a*, 604*b* may be a hypervisor that performs VM management in connection with multiple VMs such as VMware ESX Server. Such a hypervisor may be installed and run directly on server hardware without requiring an underlying operating system.

Each of the VM managers 604*a*, 604*b* may perform management of the underlying server's physical resources for use among the multiple VMs that can run simultaneously. In this example, a database application is executed by VM1 602*a*, an email application is executed by VM2 602*b* and a video application is executed by VM3 602*c*. VM manager 1 604*a* may execute on a first host 605*a* and VM manager 2 604*b* may execute on a second host 605*b*. Element 602*a* may be a data storage system. Data storage system 602*a* may include physical storage provisioned for use with VVOLs 1, 2 and 3 (virtual volumes 1, 2 and 3) 608*a*, 608*b*, 608*c*. VMs 602*a*-*b* of host 605*a* may access and use data stored on VVOL 1 608*a* and VVOL2 608*b*. VM 602*c* of host 605*b* may access and use data stored on VVOL 3 608*c*.

Data used by a VM that is stored on a VVOL may include data used by the particular application executing on the VM (e.g., database data and log files for a database application executing on a VM such as VM 1 602*a*) as well as VM metadata regarding its state, configuration, and execution context such as, for example, data stored in memory, CPU registers, swap files, log files, and the like.

It should be noted that the data storage system 602*a* may include components of the data storage system described elsewhere herein for use with techniques herein. Such detail has been omitted in this particular figure for simplicity.

It should be noted that although embodiments described herein may refer to VMWare and its virtualization environment, more generally, techniques herein may be extended for use with other virtualization environments of any suitable vendor.

In such an environment with applications as in FIG. 6, each application may have a different workload or I/O access pattern. For example, the database application 602*a* may have a primarily sequential read or write access pattern, and the email application 602*b* may perform random reads and/or writes with respect to the email user data. However, each of the applications 602*a*, 602*b* may also maintain a log file which logs reads and writes performed whereby a sequential write pattern may characterize accesses to such log file. The video application 602*c* may perform primarily sequential reads to download video data.

Thus, FIG. 6 is an example of the disparate I/O application workloads at a point in time that may be sent to the same data storage system and thereby use the same data cache and other common data storage system resources.

The data storage system 602*a* may utilize techniques described herein as set forth in more detail in following paragraphs.

Figure 7:
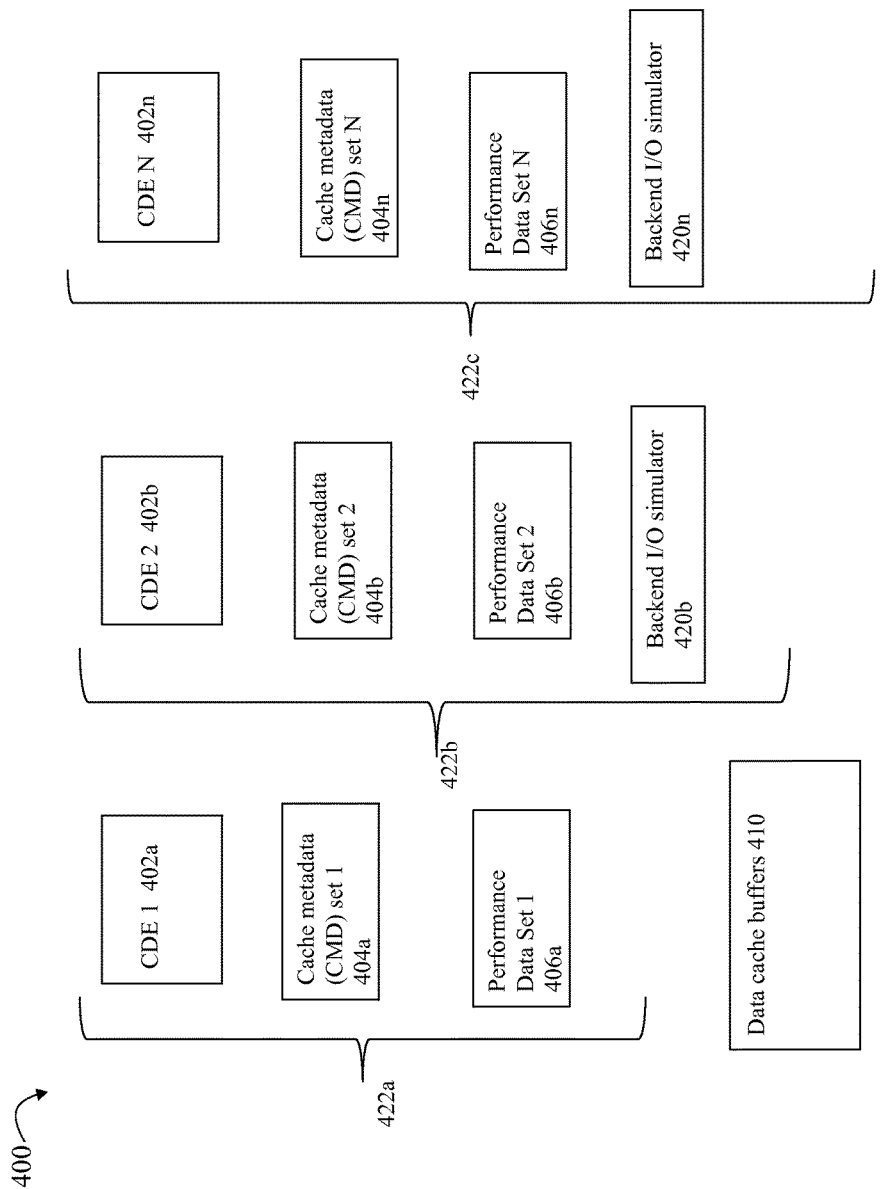
FIGS. 7 and 8 are examples of code modules, cache buffers and different data sets that may be used in an embodiment in accordance with techniques herein.

Referring to FIG. 7, shown is an example 400 of components that may be included in a data storage system in an embodiment in accordance with techniques herein. The example 400 includes N CDE modules 402*a*-*n*, N cache metadata (CMD) sets 404*a*-*n*, N performance data sets 406*a*-*n*, backend I/O simulators 420*b*-*n*, and data cache buffers 410. In an embodiment in accordance with techniques herein, generally N may be any integer greater than 1. Generally, the cache may be characterized as comprising cache metadata (CMD) and data cache buffers 410 which may be memory storing only the cached data. Each of element 404*a*-*n* represent a different set of CMD as may be maintained and updated as a result of executing a different corresponding one of the CDEs 402*a*-*n* for a received set of I/O operations.

Each of the CDEs 402*a*-*n* may represent a code module that executes a different caching algorithm or technique affecting one or more aspects of data caching some of which are described herein. Each of the CDEs 402*a*-*n* may, respectively, have their own associated CMD set 404*a*-*n* and performance data set 406*a*-*n*. One of the CDEs, such as CDE1 402*a*, may be used to perform the actual non-simulated data caching (actually used to service the I/O) thereby determining what data is stored in the data cache buffers 410 and updating and maintaining its corresponding CMD, such as CMD set 404*a*. The remaining CDEs 402*b*-*n* may simulate servicing an I/O operation including simulating caching by updating and maintaining corresponding sets of CMD 404*b*-*n* without moving data to or from an actual data cache (e.g., without moving data to or from a set of data cache buffers such as represented by 410). Additionally, for each of the CDEs 402*b*-*n* simulating data caching, processing may also be performed to simulate backend I/Os using a backend I/O simulator. Elements 420*b*-*n* respectively represent the backend I/O simulators for CDEs 402*b*-*n*. Each of the backend I/O simulators 402*b*-*n* may simulate reading data from PDs and writing data to PDs such as may be performed when simulating servicing I/Os, simulating destaging data from cache to PDs, simulating reading data from a PD and simulating storing such data in cache, and the like. Each of the performance data sets 406*a*-*n* may represent performance data such as regarding cache performance obtained as a result of executing a particular corresponding one of the CDEs 402*a*-*n*.

The example 400 includes additional notation identifying a set of items that may be characterized as associated with a single CDE instance. Element 422*a* indicates the CDE 402*a* and its associated CMD set 1 404*a* and associated performance data set 406*a*. Element 422*b* indicates the CDE 402*b* and its associated CMD set 2 404*b*, associated performance data set 406*b*, and associated backend I/O simulator 420*b*. Element 422*n* indicates the CDE 402*n* and its associated CMD set N 404*n*, associated performance data set 406*n*, and associated backend I/O simulator 420*n*. Thus, for example, when an I/O operation is received, CDE1 420*a* is executed in connection with servicing the I/O operation using data cache contents as stored in data cache buffers 410 and associated CMD set 404*a*. As a result of servicing the I/O operation, 410, 404*a* and 406*a* are accordingly updated as necessary. For the same I/O operation, CDE 2 420*b* is executed in connection with simulating servicing the I/O operation using a simulated cache as represented by the associated CMD set 404*b* and simulating any necessary backend I/Os using backend I/O simulator 420*b*. As a result of simulating servicing the I/O operation, 404*b* and 406*b* are accordingly updated as necessary. The foregoing is also repeated for each remaining associated set of components (e.g., such as 422*c*) used for simulating servicing the I/O operation, simulating caching and simulating backend I/Os.

An embodiment in accordance with techniques herein may have multiple CDEs 402*a*-*n* each executing code for a different algorithm that may be characterized by a different set of one or more parameters. The CDE parameters may, for example, identify the particular type of workload or I/O access pattern for which the CDE is customized.

For example, one or more CDE parameters may identify that the CDE is customized for a workload or I/O access pattern that is primarily sequential reads and therefore the CDE may use caching techniques whereby sequential read data may be evicted from cache any time after being returned to host, where the CDE may perform aggressive prefetching once a sequential read pattern is detected, and the like.

As another example, one or more CDE parameters may identify that the CDE is customized for a workload or I/O access pattern that is primarily sequential writes and therefore the CDE may use caching techniques whereby such write data may be evicted from cache any time after the WP data is destaged to physical storage.

As yet another example, one or more CDE parameters may identify that the CDE is customized for a workload or I/O access pattern based on one or more aspects of locality of reference whereby it is expected that I/Os may repeatedly read same sets of data items (e.g., such as due to coding loops being repeatedly executing which read the same data, executing code which generally reads a same set of data, which may not necessarily be a logically sequential pattern of reads, for a period of time). Therefore such data should remain in cache for a time period such as based on when cached data is last referenced.

The one or more CDE parameters may identify a characteristic of the technique used for cache eviction or otherwise effecting how long a data item remains in cache (e.g., LRU or least recently used), identify the number of sequential I/Os before a sequential pattern is detected, identify an amount of data prefetched, identify a threshold amount of cache used for storing WP data, identify a threshold amount of cache used for storing read data, and the like.

Data may remain in the data cache an amount of time, for example, based on how frequently the data is accessed and also how recently such data has been accessed. For example, LRU (least recently used) is a technique that may be used by a CDE when determining what data to evict from cache when additional cache storage is needed. With LRU, it is assumed that the most recently accessed data is more likely to be accessed in connection with subsequent I/O operations. As such, the amount of time that has elapsed since cached read data was last accessed may be used in connection with deciding which data to evict from cache. The foregoing is one example of processing that may be performed by a data storage system in an embodiment in accordance with techniques herein. For example, an embodiment in accordance with techniques herein may perform caching techniques such as described in U.S. Pat. No. 7,155,573, issued Dec. 26, 2006, CACHE FALL THROUGH TIME ESTIMATION, Levin-Michael et al., which is incorporated by reference herein, and U.S. Pat. No. 6,715,039, issued Mar. 30, 2004, CACHE SLOT PROMOTION IN A REPLACEMENT QUEUE CACHE USING DETERMINATIONS OF PROBABILITIES AND COSTS, Michael et al., which is incorporated by reference herein. Thus, one or more CDE parameters may identify aspects such as whether the lifetime of a data items in cache is determined based on the last or most recent usage and if the CDE implements an LRU-based technique for selecting a next data item evicted from cache.

In one embodiment of a data storage system, data prefetching may be implemented when reading data from physical storage. As known in the art, data prefetching may be performed in response to detection of sequential read patterns. A sequential read pattern may be detected, for example, when multiple consecutive read operations result in sequentially reading a set of logically contiguous data. For example a first read operation may read data from LUN X, LBA 1-3 and a second read operation may read data from LUN A, LBA 4-6. Upon receiving the second read operation, a sequential read pattern may be detected. Prefetching may be performed in response to detecting a sequential read pattern since it is likely that such sequential pattern of reading data may continue in subsequent not yet received read operations. In this manner, when retrieving the read data for LUN A, LBA 4-6 of the second read operation, additional data of the sequential pattern may also be prefetched beyond what is currently requested. For example, LUN A, LBA 7-8 may be prefetched even though such data has not been requested for a read operation. Such prefetching may be characterized as a predictive heuristic allowing for prefetching of data from the physical device prior to such data actually being requested. In this manner, the cache may be prepopulated with prefetched data (next expected sequential data in the detected pattern) prior to actually receiving the subsequent read request for the prefetched data in order to increase performance and reduce the response time for servicing requests. Thus, an embodiment in accordance with techniques herein may implement prefetching and may also detect a sequential read. If prefetching is performed, an embodiment may store the prefetched data, along with the requested data in cache. The prefetched data may be the next logically sequential data in the detected sequential read pattern (e.g., next logically contiguous data in accordance with the logical addresses or offsets of the LUN).

It should be noted that, more generally, the CDE may detect or recognize a sequential read pattern upon the occurrence of "N" logically sequential reads occurring, where N may be any suitable positive integer such as greater than 1. Thus, different techniques used by the CDE may use different values for N. Additionally, the CDE may prefetch an amount of data M, where M may be any suitable positive integer such as greater than 1, and where M represents an amount of storage to prefetch responsive to detecting a sequential read pattern. Thus, one or more CDE parameters may identify whether prefetching is performed and, if so, also one or more aspects about such prefetching techniques (e.g. such as particular values for N or M that may be used by a CDE).

As noted above and illustrated in FIG. 7, each of the CDEs 402a-n may have its own set of CMD 404a-n. When an incoming I/O is received and it is necessary to determine a cache location for storing the read miss or WP data for the I/O, each CDE instance 402a-n executes to select a cache location using its particular algorithm and accordingly updates its corresponding CMD set 404a-n. However, as described herein, only one instance of the CDE and cache metadata reflects that of the actual data cache contents (e.g., 410). For example, CDE 402a may be used to implement the data caching affecting the data cache buffers 410. The remaining CDEs 402b-n and associated CMD sets 404b-n may be characterized as simulating caching and do not actually use a data cache such as 410 (e.g., there is no movement of data into or out of cache for the CDEs 402b-n simulating caching).

In one embodiment in accordance with techniques herein, all the CDEs 402a-n may be executed in parallel and process the same set of I/O operations received from one or more applications on one or more hosts. For example, DSE1 402a is executed to process a received I/O operation and accordingly perform any updates to its associated CMD set 404a and performance data set 406a and also the data cache buffers 410. Also, in parallel for each I/O received, each of the CDEs 402b-n is executed to simulate caching for each I/O by accordingly updating each CMD set 404b-n. A set of CMD for a particular CDE is updated in accordance with the results of executing the particular CDE. For example, CDE 402b may select a first data item to evict from its simulated cache and accordingly update its CMD set 404b. A second CDE, such as CDE N 402n may select a second different data item to evict from its simulated cache and accordingly update its CMD set 404n. In this manner, each CDE may maintain its own set of cache metadata which is updated based on the particular algorithm of the associated CDE. Only one of the CDEs, such as CDE 402a, is actually used to service the I/O operation including updating the cache data contents 410 and accessing PDs of the storage system as needed to service the I/O. Each of the remaining CDEs 402b-n may be characterized as simulating the servicing of the I/O operation including simulating caching (e.g., through use of corresponding individual sets of CMD 404b-n generated as a result of executing the particular CDE algorithms) and simulating backend PD I/Os (e.g., using a corresponding one of the backend I/O simulators 420b-n).

As illustrated in FIG. 7 and noted above, for each CDE 402a-n, a set of performance data 406a-n is maintained. When executing a particular CDE, such as CDE 402a, to process an I/O operation, its corresponding performance data set, such as 406a, may be updated. In one embodiment, each set of performance data 406a-n may include one or more measured or observed performance metrics used to empirically evaluate and compare performance of the different CDEs 402a-n each of which has processed the same set of I/O operations. The CDEs 402a-n may be executed for a time period during which the set of I/O operations are received and processed using CDEs 402a-n as described herein. The performance data may characterize cache performance during this time period and may include any one or more suitable metrics some examples of which will now be described.

The performance data may include any of a cache hit ratio (e.g., across both reads and writes denoting a ratio of the number of I/Os that resulted in a cache hit with respect to the number of I/Os), a read hit ratio (e.g., cache hit ratio for reads denoting a ratio of the number of reads that resulting in a cache hit with respect to the number of reads), and a write hit ratio (e.g., cache hit ratio for writes denoting a ratio of the number of writes that resulting in a cache hit with respect to the number of writes) for a time period of observation. Generally, the higher any of the foregoing ratios, the better the performance.

The performance data may include a metric denoting an amount of "wasted" prefetch data which is prefetched data that never results in a read cache hit before being evicted from cache. This may be, for example, a ratio of an amount of prefetched data that has not been read from cache before being evicted with respect to a total amount of data prefetched during the time period od observation. Generally, the lower this ratio, the better the performance.

The performance data may include a metric denoting, for a time period of observation, a number of write operations each writing data to a target location whereby, when storing the write data in cache prior to destaging, results in overwriting existing cached data for the same target location and the existing cached data has already been destaged. For example, there may be a first write operation that writes first data to LUN A, LBA X and the first data is stored in cache at a first cache location, and marked as WP where such first data is subsequently destaged from cache to a PD and the WP flag cleared. Thus, after destaging WP cached first data to PD, the corresponding first data is still in cache at the first cache location. A second write may be received that writes second data to the same LUN A LBA X where the second data is stored in the first cache location holding data for LUN A LBA X. The first cache location is then marked as WP and the second data is destaged at a later point in time. In the foregoing, two destages were performed for destaging different data written to the same PD location. The foregoing is an example of where destaging may be performed too frequently (e.g., had the destaging of the first data not occurred, the second data would have merely overwritten the first data marked as WP in the first cache location and only a single destaging operation would be performed to destage the second data). Generally, the lower this number, the better the performance meaning that destaging is tuned properly.

The performance data may include a metric denoting a ratio of a "number of PD accesses" with respect to an "I/O count" for the time period of observation. The "number of PD accesses" may denote a number of backed PD I/Os (e.g., read or write to a PD location) performed to service a number of received host I/Os rach directed to a location on a logical device. "I/O count" may denote the number of received host I/Os directed to a location on a logical device. For example, 10 host read I/Os may be received directed to the same logical device location. The first host read may result in a cache miss whereby one backend PD read I/O operation is performed. The next 9 read I/Os to the same logical device location may result in cache hits and no additional backend PD I/Os so that the ratio may be 1/10. Generally, the lower this ratio, the better the performance.

The performance data may include an average response time (RT) denoting an average amount of time to service an I/O operation during the time period of observation. Generally, the lower the RT, the better the performance.

An embodiment may use the same model in each of the backend I/O simulators 420b-n. The particular model used to simulate the foregoing with respect to PDs may vary with level of complexity and acceptable amount of simulation or modeling error that may be introduced. As with any modeling, the more accurate the model in representing real world or actual conditions, the more accurate the modeling results. One embodiment may use a simplified backend I/O simulator to simulate reading data from PDs to cache and writing data to PDs from cache. For example, a simplified model may use an average amount of time it takes to perform a particular read or write with respect to the particular type of PD being accessed. For example, an embodiment may have a table of amounts of time it takes to read and write a certain amount of data from EFD, a FC rotating disk drive, a SAS rotating disk drive, a SATA rotating disk drive, an NL-SAS rotating disk drive, and the like.

As a more simplified model, the same amount of time X may be used for reading an amount of data from any PD of any type and the same amount of time Y may be used for writing an amount of data to any PD of any type.

A more complex model used in implementing each of 420b-n may account for different and more complex modeling factors and thus more closely and accurately model real world conditions and results. For example, a model simulating reading and writing with respect to PDs may take into account queueing of I/Os to different PDs where at most a maximum number of such outstanding PD I/Os may be queued. As another factor, the model may also perform outstanding I/Os in a particular order based on the particular PD location. As another factor, the modeling may take into account possible different metadata representations and impact this may have on simulating reads and writes to PD. For example, a CDE using cache metadata which includes an LBA ordered tree (where writes to PD may be destaged based on PD location order) may be more efficient with less delay than a CDE algorithm that does not. The foregoing regarding examples of different CMD representations is described in more detail elsewhere herein.

After executing the CDEs 402a-n for a time period and collecting performance data sets 406a-n, processing may be performed to evaluate performance of the CDEs 402a-n using the performance data sets 406a-n. If one of the CDEs 402b-n simulating I/Os and caching has better performance than the current CDE 402a used for actual data caching, then the one CDE simulating I/Os and caching that outperforms CDE 402a may be selected and used in implementing subsequent data caching and servicing subsequent I/Os. Thus, the selected one of the CDE's 402b-n may replace CDE 402a. An embodiment may perform such an assessment or evaluation periodically based on any suitable time interval.

Additionally, an embodiment may make a determination as to whether to switch out or replace CDE 402a with a better performing one of CDEs 402b-n in accordance with one or more criteria. For example, the criteria may include specifying that the selected one of the CDEs 402b-n replacing CDE 402a result in at least a measured threshold level of improvement or difference in performance as determined in accordance with one or more cache performance metrics. For example, one embodiment may use performance data including any one of the cache hit ratios described herein and evaluating may include determining whether any one of the CDEs 402b-n simulating I/O servicing and caching has a cache hit ratio that is at least a threshold amount more than another hit ratio associated with the CDE 402a currently used to implement the non-simulated or actual data caching. Another second embodiment may base such a decision on more than just the cache hit ratio such as the cache hit ratio in combination with any one or more of the other performance data metrics described herein. The second embodiment may combine the multiple performance metrics in any suitable way such as, for each performance metric, perform a comparison of the measured performance metric for each CDE simulating caching and the CDE currently used to implement the actual non-simulated data caching, using a weighting equation or formula, and the like.

The criteria may also include a specified minimum amount of time denoting that the current CDE 402a cannot be replaced by another one of the CDEs 402b-n unless the current CDE 402a has been used for data caching for the specified minimum amount of time. Thus, the foregoing minimum amount of time denotes a minimum amount of time between consecutive CDE replacements used for data caching to avoid switching CDEs used for data caching too frequently.

Thus, techniques herein may be used to dynamically optimize evaluation and selection of a caching algorithm and associated CDE used based on measured performance data. Techniques herein may be repeated over time to thereby adapt the selection of a CDE used for data caching and servicing I/Os based on changing I/O patterns and workloads.

Figure 8:
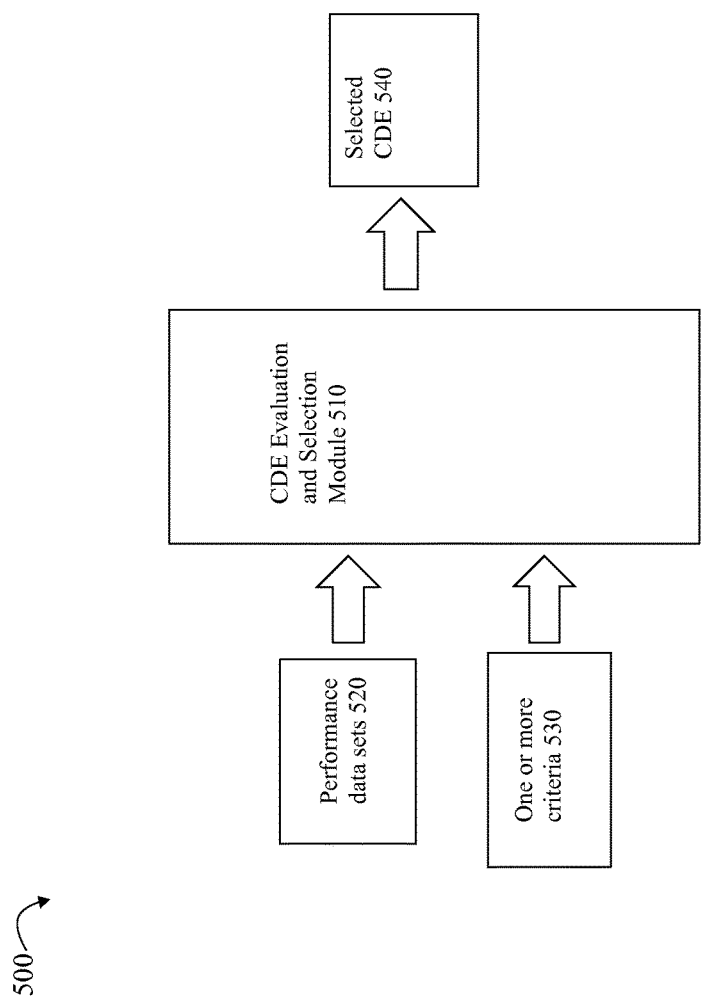

Referring to FIG. 8, shown is an example illustrating data flow and components that may be used in an embodiment in accordance with techniques herein. The example 500 includes CDE evaluation and selection module 510 which may take inputs including performance data sets 520 and one or more criteria 530. Based on the performance data sets 520 and the one or more criteria 530, the module 510 may select and determine output 540 denoting one of the CDEs 402a-n to be used for data caching and servicing received I/Os. Element 520 may represent element 406a-n collected for a time period. Element 530 may represent the one or more criteria such as the threshold level of improvement and minimum amount of time described above. Module 510 may perform evaluation processing as described above. Assume that criteria 530 includes both the threshold level of improvement and minimum amount of time described above. Provided that CDE 420a has been used in data caching for at least the minimum amount of time, the selected CDE 540 may be one of the CDEs 402b-n that outperforms CDE 420*a* and meets the threshold level of improvement requirements included in the criteria 530. If there is no one of the CDEs 402*b-n* that outperforms CDE 420*a* and meets the threshold level of improvement requirements included in the criteria 530, output 540 may be CDE 402*a*. Similarly if any other criteria 530 is not met, output 540 may be CDE 402*a*.

What will be described are flowcharts in FIGS. 9A-C summarizing processing described above.

Figure 9A:
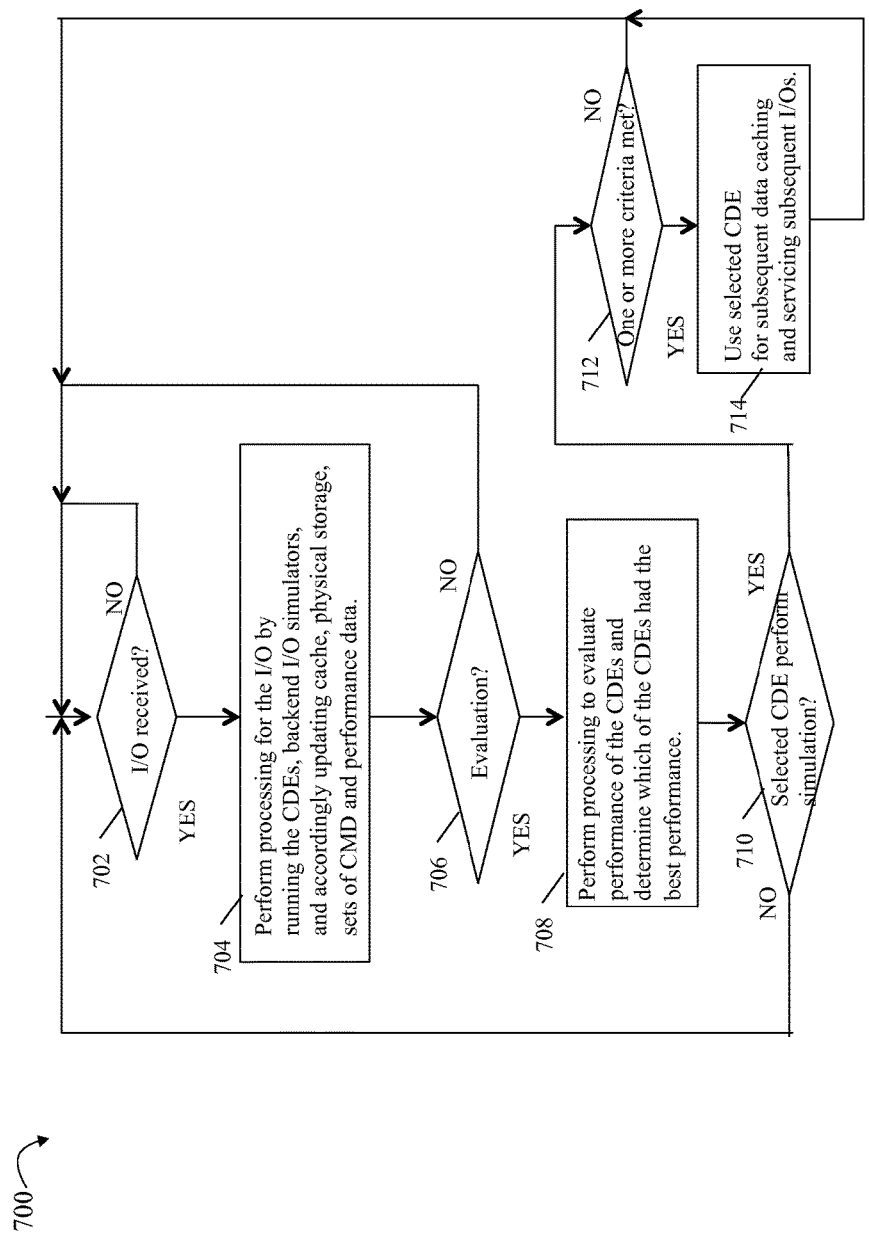
FIGS. 9A, 9B and 9C are flowcharts of processing steps that may be performed in an embodiment in accordance with techniques herein.

Referring now FIG. 9A, shown is a first flowchart 700 of processing steps that may be performed in an embodiment in accordance with techniques herein. At step 702, a determination is made as to whether an I/O operation has been received at the data storage system. Processing remains at step 702 until step 702 evaluates to yes whereby control then proceeds to step 704. At step 704, processing is performed to service the I/O and also simulate servicing the I/O by running the multiple CDEs, such as CDE 402*a-n* of FIG. 7. Additionally, and generally, step 704 may include running backend I/O simulators for CDEs 402*b-n* and accordingly updating cache, physical storage, and the sets of CMF and performance data for the CDEs 402*a-n*. At step 706, a determination is made as to whether it is time to perform an evaluation of the CDEs 402*a-n*, such as each occurrence of a predetermined evaluation time interval. If step 706 evaluates to no, control proceeds to step 702. If step 706 evaluates to yes, control proceeds to step 708 to perform processing to evaluate performance of the CDEs and determine which of the CDEs 402*a-n* has the best performance, such as based on the sets of performance data 406*a-n* of FIG. 7. At step 710, a determination may be made as to whether the selected CDE from step 708 having the best performance currently simulates servicing I/O operations including simulating caching and backend I/O operations. If step 710 evaluates to no, control proceeds to step 702. If step 710 evaluates to yes, control proceeds to step 712 to determine whether the one or more criteria used to determine whether to switch or replace CDE 402*a* has been met. If step 712 evaluates to no, control proceeds to step 702. If step 712 evaluates to yes, control proceeds to step 714 whereby processing may be performed to automatically switch CDEs used for subsequent data caching and servicing subsequent I/Os. Step 714 may include replacing CDE 402*a* with one of the CDEs 402*b-n* having the best performance. When switching CDEs used in implementing the actual data caching whereby a new CDE is replacing an existing CDE 402*a*, one embodiment may populate or update the data cache contents using the CMD of the new CDE. Alternatively, an embodiment may not modify the current cached data contents of the data cache buffers 410. Rather the new CDE may be used to service any subsequent I/Os and for subsequent data caching where the new CDE retains the CMD set 404*a* and data cache buffers 410 utilized by the prior CDE 402*a* that performed data caching (prior to the switchover).

Figure 9B:
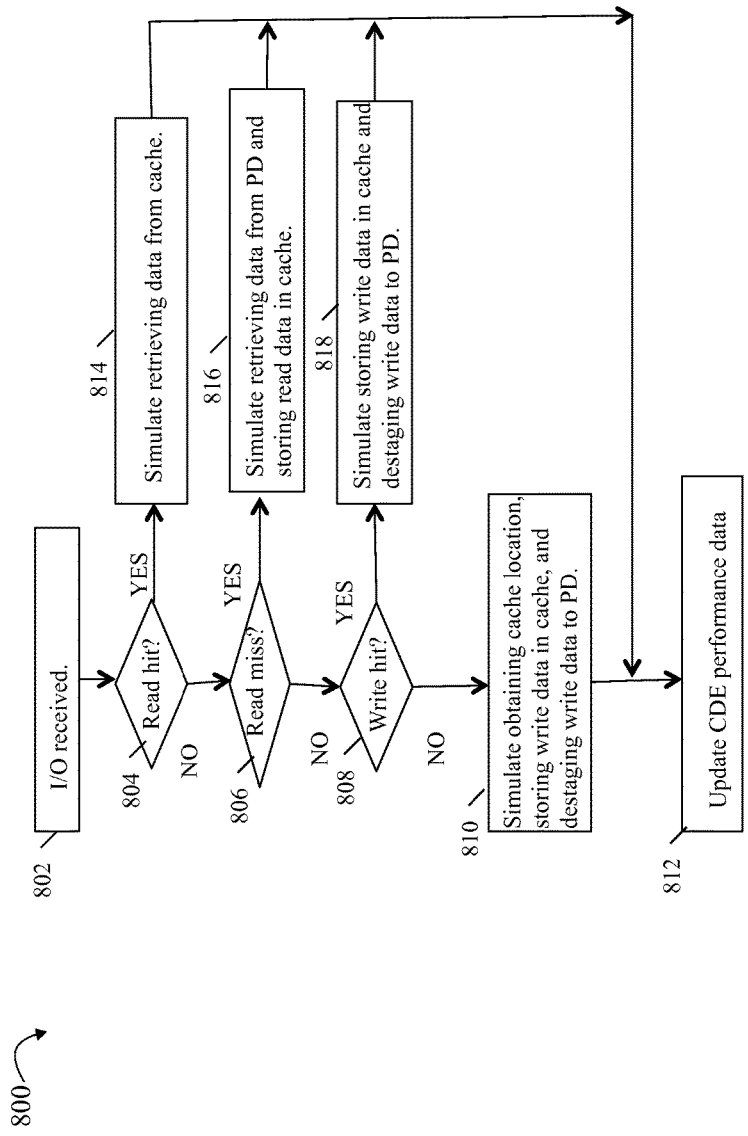

Referring to FIG. 9B, shown is a flowchart of processing steps that may be performed in an embodiment in accordance with techniques herein in connection with one of the CDE simulating servicing an I/O operation. Flowchart 800 provides additional detail regarding step 704 processing by one of the CDE simulating servicing an I/O operation and simulating caching. At step 802, an I/O operation is received. At step 804, a determination may be made as to whether the I/O is a read operations resulting in a read hit. If step 804 evaluates to yes, control proceeds to step 814 where processing is performed to simulate retrieving the requested read data from cache. Step 814 may include updating CMD for the CDE. Control then proceeds to step 812.

If step 804 evaluates to no, control proceeds to step 806 where a determination is made as to whether the I/O operation is a read operation resulting in a read miss. If step 806 evaluates to yes, control proceeds to step 816 where processing is performed to simulate retrieving requested read data from physical storage and to simulate storing the read data in cache. Step 816 may include using the backend I/O simulator for the particular CDE and updating CMD for the particular CDE. Control then proceeds to step 812.

If step 806 evaluates to yes, control proceeds to step 808 where a determination is made as to whether the I/O operation is a write operation resulting in a write hit (e.g., write to a target location that currently does have its data stored in cache). If step 808 evaluates to yes, control proceeds to step 818. At step 818 processing is performed to simulate storing the write data in the data cache and to simulate destaging the write data from cache to physical storage Step 818 may include using the backend I/O simulator for the particular CDE and updating CMD for the particular CDE (e.g. such as to indicate the cache location storing the write data as being WP). Control then proceeds to step 812.

If step 808 evaluates to no meaning that the I/O operation is a write operation resulting in a write miss (e.g., write to a target location that currently does not have its data stored in cache), control proceeds to step 810 where processing is performed to simulate obtaining a cache location for storing the write data, simulate storing the write data in cache and simulate destaging the write data to physical storage. Step 810 may include using the backend I/O simulator for the particular CDE and updating CMD for the particular CDE (e.g. such as to indicate the cache location storing the write data as being WP). Control then proceeds to step 812 where processing is performed to update the CDE's performance data.

Figure 9C:
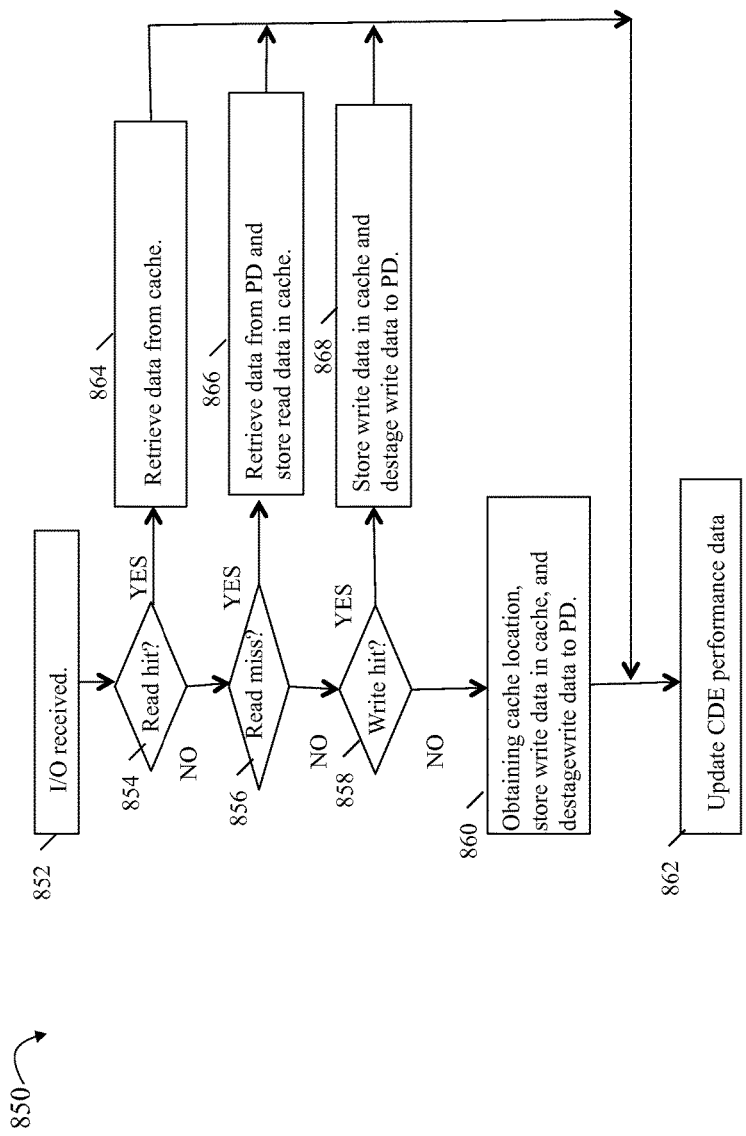

Referring to FIG. 9C, shown is a flowchart of processing steps that may be performed in an embodiment in accordance with techniques herein in connection with the CDE, such as CDE 402*a*, used in servicing an I/O operation and used to perform the actual data caching. Flowchart 850 provides additional detail regarding step 704 processing by single CDE 402*a*, used in servicing an I/O operation and used to perform the actual data caching. Steps 852, 854, 856, 858, 860, 862, 864, 866, and 868 of FIG. 9C are respectively similar to steps 802, 804, 806, 808, 810, 812, 814, 816, and 818 of FIG. 9B with the difference that the steps of flowchart 850 actually perform the data caching using the data cache buffers 410 rather than simulate data caching and the steps of flowchart 850 perform an backend I/Os by accessing the appropriate PDs rather than simulate such processing using a backend I/O simulator. Additionally, consistent with description herein, the CDE 402*a* uses its own sets of CMD 404*a* and performance data 406*a*.

It should be noted that embodiment in accordance with techniques herein may perform automatic switching or replacement of a CDE, such as CDE 402*a*, with a better performing one of CDEs 402*b-n* simulating I/O servicing including simulating data caching. Additionally, an embodiment in accordance with techniques herein may simply omit performing the replacement. For example, an embodiment may perform processing as described herein to collect performance data sets 406*a-n* and evaluate and select a better performing one of CDEs 402*b-n* simulating I/O servicing including simulating data caching. However, step 714 of FIG. 9A may be omitted. Thus, techniques herein may be used to evaluate multiple CDEs and associated caching techniques without actually implementing or performing a CDE switch.

As noted above, when switching CDEs whereby CDE 402a is replaced with a selected one of the CDEs 402b-n, the selected CDE may use a different CMD format than CDE 402a. As described herein, the selected one of CDEs 402b-n may resume data caching using the CMD set 1 404a. However, if CDE 402a uses a CMD format that is different from the CMD format used by the selected one of the CDEs 402b-n, then the CMD 404a may be converted to the CMD format used by the selected one of the CDEs 402b-n.

Figure 10:
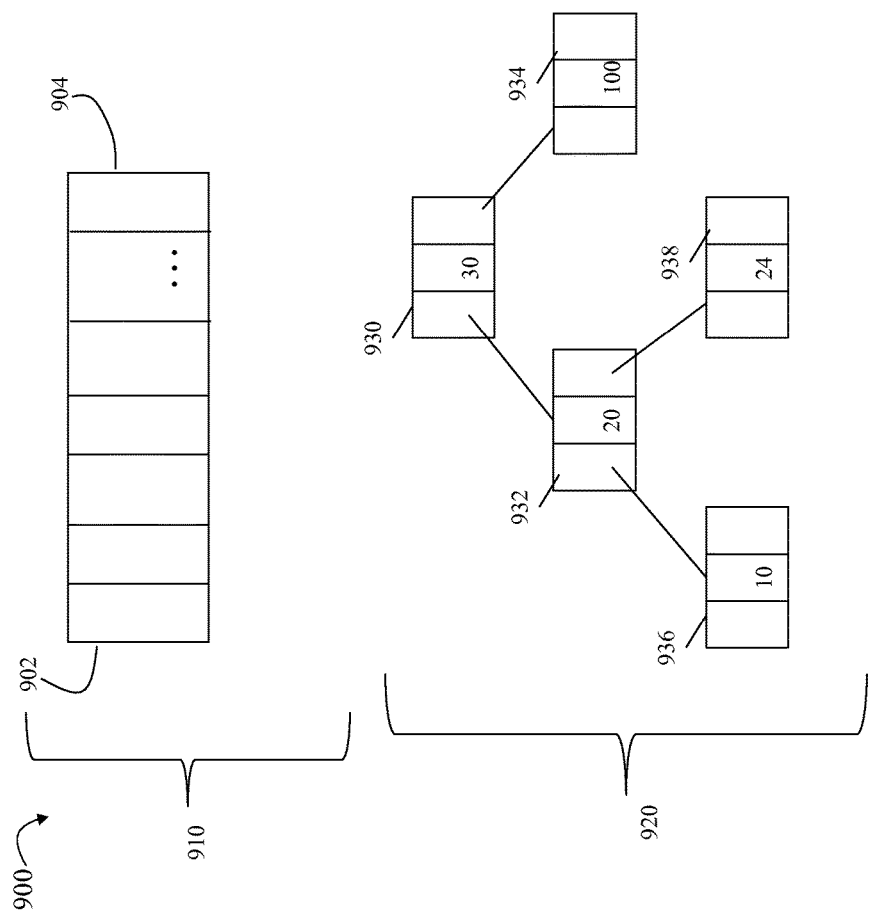
FIG. 10 is an example of data structures that may be represented using cache meta data in an embodiment in accordance with techniques herein.

For example, with reference to FIG. 10, one of the CDEs 402a-n may have a CMD format comprising information of two data structures. A first data structure 910 may be a linked list of cached data items based on an LRU ordering (e.g., last time the data item in cache was accessed such that the least recently accessed is located at end 902 and is the first data item to be selected for eviction from cache and the most recently accessed data item may be located at end 904 and is the last data item to be selected for eviction from cache). Cached data items may be evicted from cache in order beginning with 902 and ending with 904. Newly cached data items may be added, for example, to end 904 and progress or fall through the cache to end 902. If a data item current in cache is referenced while in cache, it may be moved or promoted to a different relative order or position in the linked list such as to the end 904. Thus, structure 910 may have a structure and ordering that facilitates easily removing and adding data items to cache and is sorted in an order in which the next data item to be evicted from cache may be removed from end 902

The same CMD format may also include data for a second data structure including the same referenced data items which are organized in a different manner to facilitate destaging. For example, element 920 illustrates the second data structure that may be a binary tree structure having an ordering based on PD location. For example, an embodiment may include a representation of the tree structure 920 for each PD that includes multiple nodes each representing a PD location to which data is to be destaged. For a given node having a corresponding PD location, all nodes to the left of the node may have an associated PD location that is less than the node's PD location and all nodes to the right of the node may have an associated PD location that is more than the node's PD location. For example, node 930 may be the root of the tree representing data to be destaged to PD location 30. Node 932 represents data to be destaged to PD location 20. Node 934 represents data to be destaged to PD location 100. Node 936 represents data to be destaged to PD location 10. Node 938 represents data to be destaged to PD location 24. The second data structure may be used, for example, when destaging cached data items to physical storage. In contrast, the first data structure may be used, for example, to select a next data item to be evicted from cache. Thus, each of 910 and 920 may include the same data organized in a different manner for a different purpose.

Thus, for example, CDE 402a may have a CMD format representing both structures 910 and 920. A CDE may be selected, such as CDE 402b, to replace 402a whereby CDE 402b may use CMD data of only the first structure 910. In this case, CMD set 404a may be converted to the CMD format used by 402b prior to performing data caching using CDE 402b rather than 402a.

Techniques herein may be used for a variety of different purposes and in a variety of different storage environment.

As a first example, techniques herein may be used in a development or testing environment where there is only evaluation of different CDEs without replacing a current CDE used for data caching with another CDE previously used to simulate data caching. In this manner, processing may be performed to evaluate different CDEs in a controlled environment at a non-customer or development site. The I/O stream may be a generated controlled I/O stream representing a collective I/O stream from multiple applications. The various sets of performance data may be obtained and used to evaluate different CDEs.

As a second example, techniques herein may also be used to evaluate different CDEs at a customer site where there is only evaluation of different CDEs without replacing a current CDE used for data caching with another CDE previously used to simulate data caching. In this manner, processing may be performed to evaluate different CDEs using live customer data in the customer's data storage environment without actually switching in any better performing CDE. Performance data may be collected and reported, such as to the data storage system vendor such as EMC Corporation which may use such data as part of a feedback technique in evaluating different CDEs for a data storage system.

As a variation to the second example, at the customer site, processing may also be performed to evaluate different CDEs and additionally replacing a current CDE used for data caching with another CDE previously used to simulate data caching. In this manner, processing may be performed to evaluate different CDEs using live customer data in the customer's data storage environment and also repeatedly measure performance after such a change in the customer's storage environment with the customer's live application data as the I/O stream being processed.

As a fourth example, techniques herein may be used to create new CDE algorithms or variations on the fly or dynamically. Such processing may be performed, for example, in a development environment to generate and test different CDEs. For example, at a first point in time there may be 3 CDEs—CDE1, CDE2 and CDE 3—executed using techniques herein (1 CDE used for actual data caching with 2 CDEs simulating data caching). The 3 CDEs may accept as input one or more parameters specifying values affecting the caching technique performed. Thus each of the 3 CDEs may have a different set of input parameters. At a second point in time, evaluation may be performed as described herein where it is determined that one of the CDEs simulating caching, CDE2, may slightly outperform CDE1 current used for the actual caching. However CDE2 does not achieve better performance that CDE 1 by a specified threshold amount so CDE1 is not replaced by CDE2 in performing the actual data caching. At this point, CDE 3 may be discarded and a new set of CDEs may be determined for evaluation as CDEs simulating caching. The new set of CDEs may include CDE2 and also CDE2A and CDE2B which are variations of CDE2. For example, CDE2A and CDE2B may include different CDE parameter values as compared to CDE parameters of CDE2. In this manner, the CDEs may be evolve and be evaluated in real time responsive to real time detected conditions and performance evaluations The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of evaluating a plurality of caching techniques comprising:
   executing a plurality of cache decision engines each using a different one of the plurality of caching techniques, wherein the plurality of cache decision engines includes a first cache decision engine that performs data caching to store data in a data cache in accordance with a plurality of I/O operations and one or more other cache decision engines each simulating data caching in accordance with the plurality of I/O operations;
   determining, in accordance with said executing, sets of performance data wherein a different one of the sets of performance data is determined for each of the plurality of cache decision engines thereby denoting measured performance for said each cache decision engine;
   determining, using said sets of performance data and in accordance with one or more criteria, whether to use a second of the one or more other cache decision engines rather than said first cache decision engine to perform data caching; and
   responsive to determining to use the second cache decision engine rather than the first cache decision engine, performing first processing including:
      updating the data cache in accordance with a set of cache metadata that is generated by the second cache decision engine prior to determining to use the second cache decision engine rather than the first cache decision engine, wherein the set of cache metadata is generated by the second cache decision engine in accordance with processing performed when simulating data caching for the plurality of I/O operations and wherein the one set of cache metadata of the second cache decision engine includes information about each data portion stored in a simulated data cache instance when using said second cache decision engine, said information including whether said each data portion stored in the simulated data cache instance is write pending.

2. The method of claim 1, wherein each of said one or more other cache decision engines generates a different set of cache metadata, wherein the set of cache metadata is the different set of cache metadata generated by the second decision engine, and wherein said executing includes:
   updating said different set of cache metadata in accordance with processing performed by said each cache decision engine when simulating data caching for the plurality of I/O operations; and
   updating first cache metadata in accordance with processing performed by the first cache decision engine when performing data caching for the plurality of I/O operations.

3. The method of claim 1, wherein each of said sets of performance data includes a cache hit ratio.

4. The method of claim 3, wherein said cache hit ratio is any of a read cache hit ratio, a write cache hit ratio, and an aggregated I/O cache hit ratio.

5. The method of claim 1, wherein each of said sets of performance data includes an indicator denoting an amount of prefetched data that was not referenced to service any of the plurality of I/O operations prior to being evicted from cache.

6. The method of claim 1, wherein each of said sets or performance data includes a metric denoting a number of write operations, each writing data to a target location whereby, when storing write data for said each write operation in cache prior to destaging, results in overwriting existing cached data for the target location and the existing cached data has already been destaged.

7. The method of claim 1, wherein each of the plurality of I/O operations requests an I/O operation with respect to a logical device and location on the logical device, and each of said sets of performance data includes ratio of a number of physical device I/O operations performed to service the plurality of I/O operations.

8. The method of claim 1, wherein each of said sets or performance data includes an average measured response time denoting an average amount of time to complete an I/O operation.

9. The method of claim 1, further comprising:
   determining, using said sets of performance data, whether any of the one or more other cache decision engines, each simulating data caching, has better performance than said first cache decision engine;
   determining that the second cache decision engine that simulates data caching has better performance that said first cache decision engine; and
   responsive to determining the second cache decision engine has better performance than the first cache decision engine, determining, in accordance with the one or more criteria, whether to use the second cache decision engine rather than first cache decision engine to perform the data caching.

10. The method of claim 9, wherein the one or more criteria includes at least one threshold denoting a threshold amount of performance improvement.

11. The method of claim 10, wherein the one or more criteria includes a threshold minimum amount of time.

12. The method of claim 11, wherein a first of the sets of performance data denotes performance of the first cache decision engine, a second of the sets of performance data denotes performance of the second cache decision engine, and the method includes:
   determining, using said first set of performance data and said second set of performance data, whether said second cache decision engine improves performance over said first cache decision engine by at least the threshold amount of performance improvement denoted by the at least one threshold;
   determining whether said first cache decision engine has been used to perform data caching at least said threshold minimum amount of time; and
   responsive to determining that said second cache decision engine improves performance over said first cache decision engine by at least the threshold amount of performance improvement and to determining that said first cache decision engine has been used to perform data caching at least said threshold minimum amount of time, using the second cache decision engine rather than the first cache decision engine for data caching.

13. The method of claim 12, wherein processing is performed automatically to use the second cache decision engine rather than the first cache decision engine for data caching.

14. The method of claim 1, wherein the plurality of I/O operations are received at a data storage system from one or more hosts.

15. The method of claim 14, wherein each of the one or more hosts includes a plurality of applications executing in a context of one or more virtual machines in a virtualized application environment.

16. The method of claim 6, wherein the existing cached data was write pending at a first point in time, destaged at a second point in time subsequent to the first point in time, and overwritten at a third point in time subsequent to the second point in time.

17. The method of claim 1, wherein at least one of the plurality of cache decision engines that simulates data caching also simulates backend I/O operations including simulating any of: reading data from a non-volatile physical storage device and writing data to a non-volatile physical storage device.

18. A system comprising:
a processor; and
a memory comprising code stored therein that, when executed, performs a method that evaluates a plurality of caching techniques comprising:
  executing a plurality of cache decision engines each using a different one of the plurality of caching techniques, wherein the plurality of cache decision engines includes a first cache decision engine that performs data caching to store data in a data cache in accordance with a plurality of I/O operations and one or more other cache decision engines each simulating data caching in accordance with the plurality of I/O operations;
  determining, in accordance with said executing, sets of performance data, wherein a different one of the sets of performance data is determined for each of the plurality of cache decision engines thereby denoting measured performance for said each cache decision engine;
  determining, using said sets of performance data and in accordance with one or more criteria, whether to use a second of the one or more other cache decision engines rather than said first cache decision engine to perform data caching; and
  responsive to determining to use the second cache decision engine rather than the first cache decision engine, performing first processing including:
    updating the data cache in accordance with a set of cache metadata that is generated by the second cache decision engine prior to determining to use the second cache decision engine rather than the first cache decision engine, wherein the set of cache metadata is generated by the second cache decision engine in accordance with processing performed when simulating data caching for the plurality of I/O operations and wherein the one set of cache metadata of the second cache decision engine includes information about each data portion stored in a simulated data cache instance when using said second cache decision engine, said information including whether said each data portion stored in the simulated data cache instance is write pending.

19. The system of claim 18, wherein the processor and the memory are included in a data storage system and the system further comprises:
  one or more hosts that send the plurality of I/O operations to the data storage system, each of the one or more hosts including a plurality of applications executing in a context of one or more virtual machines in a virtualized application environment.

20. A non-transitory computer readable medium comprising code stored thereon that, when executed, performs a method that evaluates a plurality of caching techniques comprising:
  executing a plurality of cache decision engines each using a different one of the plurality of caching techniques, wherein the plurality of cache decision engines includes a first cache decision engine that performs data caching to store data in a data cache in accordance with a plurality of I/O operations and one or more other cache decision engines each simulating data caching in accordance with the plurality of I/O operations;
  determining, in accordance with said executing, sets of performance data, wherein a different one of the sets of performance data is determined for each of the plurality of cache decision engines thereby denoting measured performance for said each cache decision engine;
  determining, using said sets of performance data and in accordance with one or more criteria, whether to use a second of the one or more other cache decision engines rather than said first cache decision engine to perform data caching; and
  responsive to determining to use the second cache decision engine rather than the first cache decision engine, performing first processing including:
    updating the data cache in accordance with a set of cache metadata that is generated by the second cache decision engine prior to determining to use the second cache decision engine rather than the first cache decision engine, wherein the set of cache metadata is generated by the second cache decision engine in accordance with processing performed when simulating data caching for the plurality of I/O operations and wherein the one set of cache metadata of the second cache decision engine includes information about each data portion stored in a simulated data cache instance when using said second cache decision engine, said information including whether said each data portion stored in the simulated data cache instance is write pending.

* * * * *